United States Patent
Little

(10) Patent No.: US 7,107,773 B2
(45) Date of Patent: Sep. 19, 2006

(54) TURBINE ENGINE SEQUENCED COMBUSTION

(75) Inventor: David Allen Little, Chuluota, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 470 days.

(21) Appl. No.: 10/654,748

(22) Filed: Sep. 4, 2003

(65) Prior Publication Data

US 2005/0050899 A1    Mar. 10, 2005

(51) Int. Cl.
*F02C 9/26*    (2006.01)
(52) U.S. Cl. .............................. 60/773; 60/746; 60/776
(58) Field of Classification Search ............. 60/39.281, 60/746, 749, 773, 776
See application file for complete search history.

(56) References Cited

U.S. PATENT DOCUMENTS

| | | | |
|---|---|---|---|
| 3,064,903 A | 11/1962 | Butler | |
| 3,311,130 A | 3/1967 | Caldwell | |
| 3,653,206 A * | 4/1972 | Greune | .................... 60/39.281 |
| 4,027,473 A | 6/1977 | Baker | |
| 4,052,844 A | 10/1977 | Caruel et al. | |
| 4,112,676 A | 9/1978 | DeCorso | |
| 4,691,730 A | 9/1987 | Portolese et al. | |
| 4,716,719 A * | 1/1988 | Takahashi et al. | ........ 60/39.281 |
| 4,735,052 A | 4/1988 | Maeda et al. | |
| 5,114,115 A | 5/1992 | Gillott | |
| 5,226,287 A | 7/1993 | Ng | |
| 5,289,685 A | 3/1994 | Hoffa | |
| 5,442,922 A | 8/1995 | Dyer et al. | |
| 5,450,725 A * | 9/1995 | Takahara et al. | .............. 60/737 |
| 5,722,230 A | 3/1998 | Cohen et al. | |
| 5,901,555 A * | 5/1999 | Mandai et al. | ................. 60/747 |
| 5,916,126 A | 6/1999 | Szillat et al. | |

FOREIGN PATENT DOCUMENTS

| | | |
|---|---|---|
| GB | 2377257 A | 8/2003 |
| WO | WO 03/004846 A1 | 1/2003 |

* cited by examiner

*Primary Examiner*—Louis J. Casaregola

(57) ABSTRACT

Aspects of the invention relate to a method for facilitating the reduction of carbon monoxide emissions during part load operation of a turbine engine by holding high combustor temperatures. The combustor section of the turbine engine includes a plurality of combustors, each combustor having a pilot nozzle, a plurality of main nozzles circumferentially surrounding the pilot nozzle, and a premix ring. According to one aspects of the invention, a first pair of combustors are selected. Fuel can be substantially restricted from being supplied to the main nozzles and the premix ring of the selected combustors, while fuel continues to be supplied to the pilot nozzles of the selected combustors. Additional combustors can be selected and the supply of fuel can be selectively restricted as described above. The process can continue until there is substantially zero net power out of the engine.

20 Claims, 2 Drawing Sheets

TURBINE ENGINE SEQUENCED COMBUSTION

FIELD OF THE INVENTION

The invention relates in general to turbine engines and, more particularly, to a method for reducing carbon monoxide emissions during part load operation of a gas turbine.

BACKGROUND OF THE INVENTION

Turbine engines, such as single shaft industrial turbine engines, are designed to operate at a constant design turbine inlet temperature under any ambient air temperature (i.e., the compressor inlet temperature). This design turbine inlet temperature allows the engine to produce maximum possible power, known as base load. Any reduction from the maximum possible base load power is referred to as part load operation. In other words, part load entails all engine operation from 0% to 99.9% of base load power.

Part load operation may result in the production of high levels of carbon monoxide (CO) during combustion. One known method for reducing part load CO emissions is to bring the combustor exit temperature or the turbine inlet temperature near that of the base load design temperature. It should be noted that, for purposes of this disclosure, the terms combustor exit temperature and turbine inlet temperature are used interchangeably. In actuality, there can be from about 30 to about 80 degrees Fahrenheit difference between these two temperatures due to, among other things, cooling and leakage effects occurring at the transition/turbine junction. However, with respect to aspects of the present invention, this temperature difference is insubstantial.

To bring the combustor exit temperature closer to the base load design temperature, mass flow of air through the gas turbine can be restricted by closing the compressor inlet guide vanes (IGV), which act as a throttle at the inlet of the compressor. When the IGVs are closed, the trailing edges of the vanes rotate closer to the surface of an adjacent vane, thereby effectively reducing the available throat area. Reducing throat area reduces the flow of air which the first row of rotating blades can draw into the compressor. Lower flow to the compressor leads to a lower compressor pressure ratio being established by the turbine. As a result, less power can be extracted from the gas passing through the turbine, causing the turbine exhaust gases to become hotter at the turbine exit.

However, there is an exhaust temperature limit that the turbine components in the exhaust path, such as the exhaust manifold and diffuser, can withstand before degrading. For example, the exhaust temperature limit can be from about 1160 degrees Fahrenheit to about 1180 degrees Fahrenheit. Once the exhaust temperature limit is reached, combustion temperature must be dropped as load is further reduced. Thus, the goal of holding high combustor temperatures is thwarted by the exit temperature limit as load is reduced.

SUMMARY OF THE INVENTION

Thus, one object according to aspects of the present invention is to provide methods for maintaining high temperatures at the combustor exhaust while continuing to decrease load. These and other objects according to aspects of the present invention are addressed below.

Aspects of the invention relate to a method for reducing CO emissions during part load operation of a turbine engine. The method includes operating a turbine engine under part load. The engine has a compressor section, a combustor section and a turbine section. The combustor section includes a plurality of combustors, and, in one configuration, there can be sixteen combustors. Each combustor includes a pilot nozzle and at least one other nozzle. The at least one other nozzle can include a fuel ring and a plurality of nozzle assemblies disposed about the periphery of the pilot nozzle.

The method further includes selecting a first pair of combustors, and substantially restricting the supply of fuel to the at least one other nozzle of each of the first pair of combustors while continuing to supply fuel to the pilot nozzle of each of the first pair of combustors. The first pair of selected combustors can be diagonally opposed, adjacent or disposed at substantially 90 degrees with respect to each other.

Further, the method can include the step of selecting an additional pair of combustors, and substantially restricting the supply of fuel to the at least one other nozzle of each of the additional pair of combustors while continuing to supply fuel to each of the pilot nozzles of the additional pair of combustors. These steps can be repeated until there is substantially zero net power out of the engine. The method can further include resupplying fuel to one or more of the combustors pairs. In one instance, fuel can be resupplied to the one or more combustor pairs in a reverse sequence.

The engine can have an exhaust temperature limit, and the method can further involve maintaining the temperature of the turbine exhaust substantially at the exhaust temperature limit. The compressor section of the engine includes movable inlet guide vanes. Thus, the method can include the step of moving the inlet guide vanes of the compressor to a closed position.

Other aspects according to the invention relate to a method for reducing CO emissions during part load operation of a turbine engine. In accordance with the method, a turbine engine is provided where the engine is operating under part load. The engine has a compressor section, a combustor section and a turbine section. The combustor section includes a plurality of combustors, each combustor including a pilot nozzle and at least one other nozzle, wherein fuel is supplied to the pilot nozzle and the at least one other nozzle. The at least one other nozzle can include a fuel ring and a plurality of nozzle assemblies disposed about the periphery of the pilot nozzle.

The method includes selecting a first combustor from the plurality of combustors, and substantially restricting the supply of fuel to the at least one other nozzle of the first combustor while continuing to supply fuel to the pilot nozzle of the first combustor.

The method can further involve selecting another combustor, and substantially restricting the supply of fuel to the at least one other nozzle of the another combustor while continuing to supply fuel to the pilot nozzle of the another combustor. These steps can be repeated until there is substantially zero net power out of the engine. In one embodiment, the first and the another combustors can be substantially diagonally opposed.

DETAILED DESCRIPTION OF EMBODIMENTS OF THE INVENTION

Aspects of the present invention address an exhaust temperature limit that can constrain load reduction efforts such as when the turbine inlet temperature is maintained at a high level during part load operation of a gas turbine to reduce CO emissions. To that end, aspects of the present invention relate to a method for reducing load by sequencing combustion under such conditions. Such a method can help in reducing CO emissions.

Embodiments of the invention are discussed in connection with FIGS. 1–2, but the present invention is not limited to the illustrated structure or application. Further, the following detailed description is intended only as exemplary.

Figure 1:
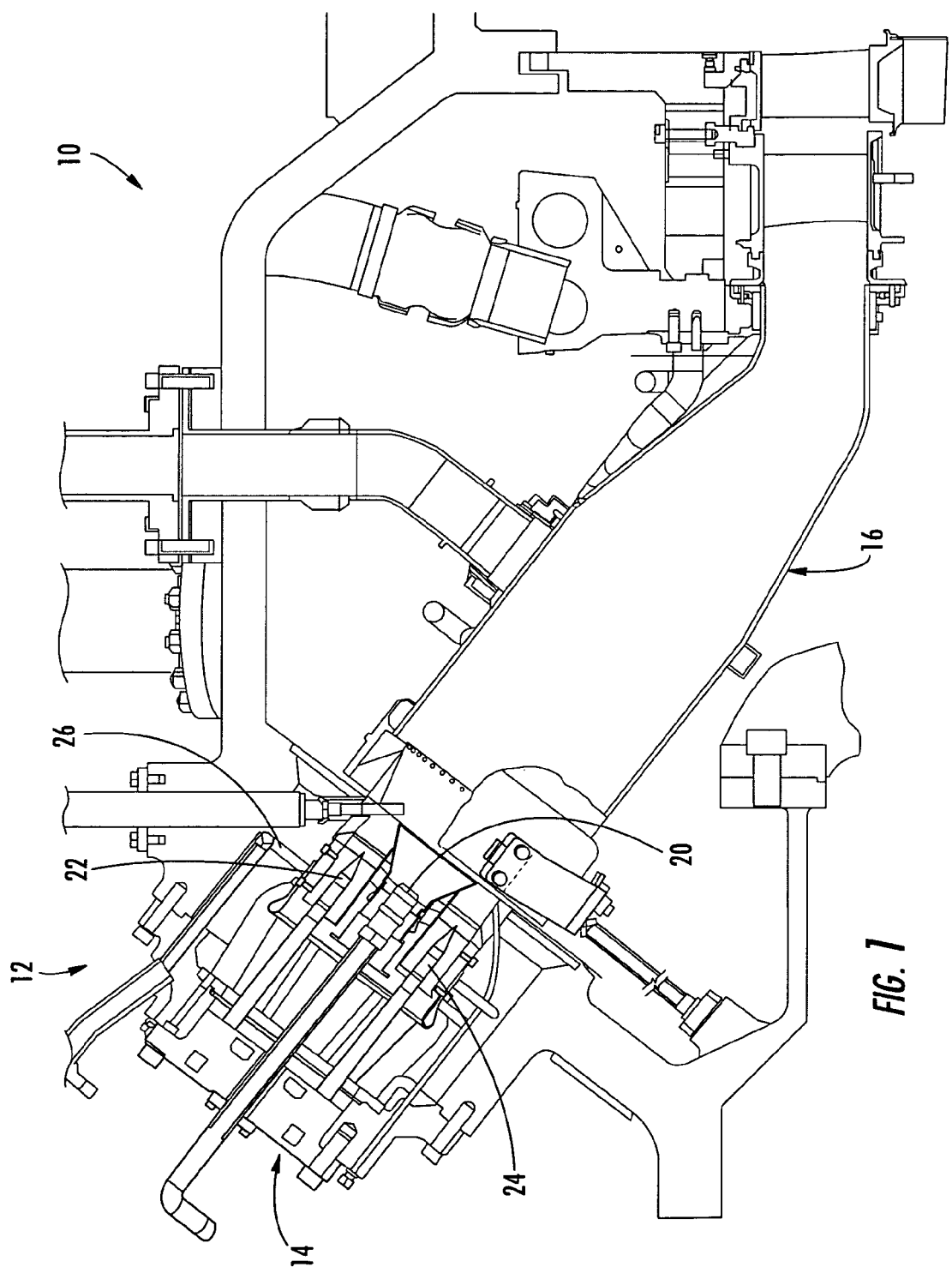
FIG. 1 is an cross-sectional view of a turbine engine, showing portions of the combustor and turbine sections of the engine.
Figure 2:
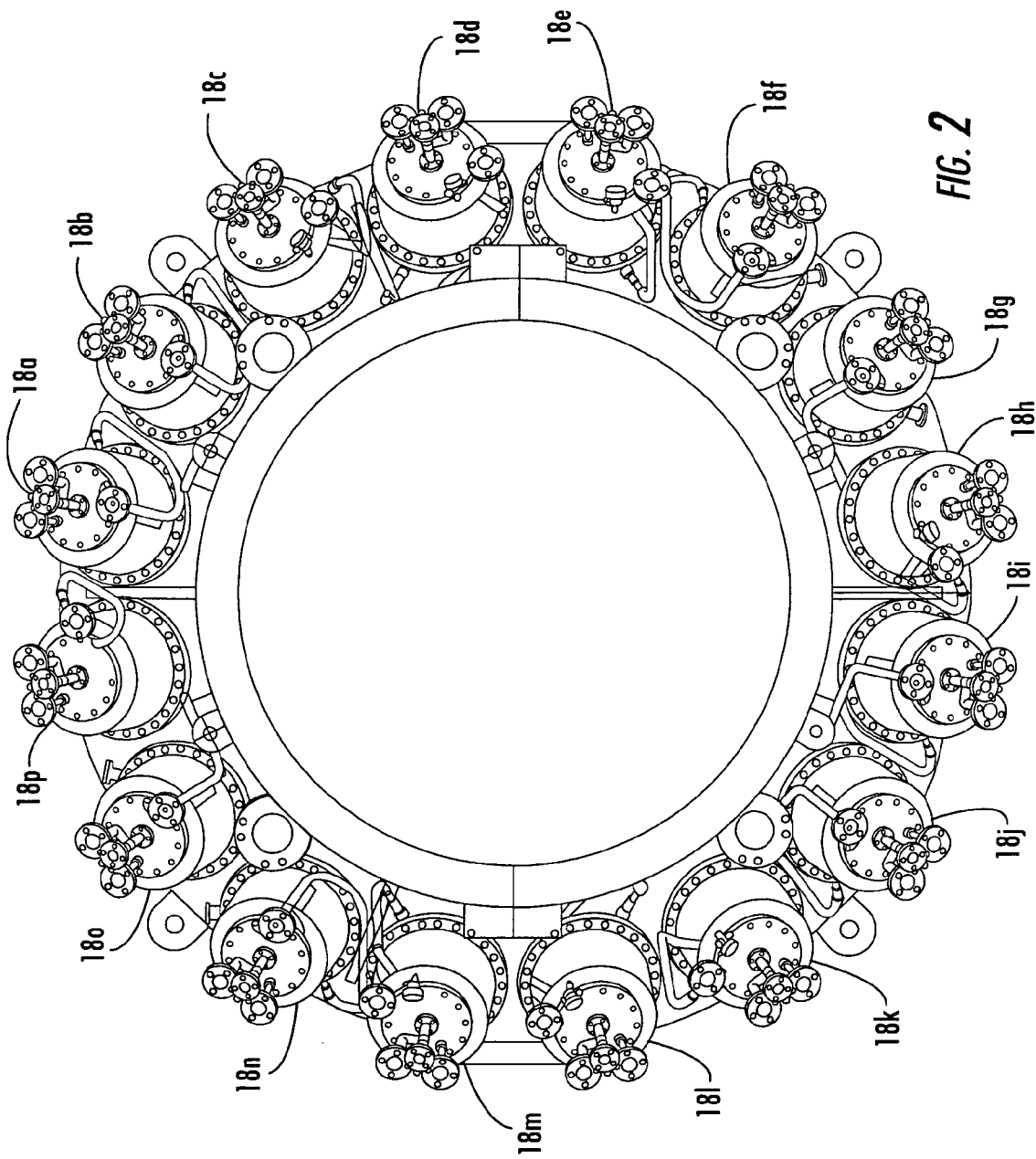
FIG. 2 is an front elevational view of the exterior of the combustor section of a gas turbine engine according to aspects of the invention.

As shown in FIG. 1, a turbine engine 10 can include a combustor section 12 having a plurality of individual combustor 14/transition 16 sets. For example, in the Siemens Westinghouse W501F series and the W501G series engines, the combustion system can comprise sixteen separate combustor/transition sets 18a,18b,18c,18d,18e,18f,18g,18h,18i, 18j,18k,18l, 18m,18n,18o,18p (hereafter referred to collectively as "18a–18p"), as shown in FIG. 2. A combustor system having sixteen combustor sets is merely an example and not intended to limit the scope of the invention. Aspects of the invention can be applied to combustor systems having any number of combustors sets.

For each combustor 18a–18p, fuel can be introduced at various points in the combustor 18a–18p. Each combustor 18a–18p can have a pilot nozzle 20 and at least one other fuel nozzle. For example, as shown in FIG. 1, in each combustor/transition set 18a–18p, fuel can be introduced through a pilot nozzle 20, four main swirler/fuel injector nozzle assemblies 22 (referred to as the A-stage), four main swirler/fuel injector nozzle assemblies 24 (referred to as the B-stage), and a premix ring 26 (referred to as the C-stage). The A and B stages 22,24 are alternated circumferentially about the pilot nozzle 20. Again, this arrangement is exemplary as other engine designs may or may not introduce fuel at each of these points. Nevertheless, aspects of the invention can be applied to these other designs.

Aspects of the present invention relate to sequencing the introduction of fuel to the various stages 22,24,26 of each combustor 18a–18p such that only primarily fully fired combustors are used. More particularly, fuel can be selectively supplied to the A, B and C stages 22,24,26 of individual combustors 18a–18p, while continuing to provide fuel to the pilot nozzle 20 of each combustor/transition sets 18a–18p.

As described earlier, part load operation at high turbine inlet temperatures can be achieved by closing the IGVs, but eventually the exhaust temperature limit will be reached, preventing further load reduction efforts without turbine inlet temperature reduction. Therefore, aspects of the present invention can be applied to allow for further reduction in load. In one aspect, two of the plurality of combustors 18a–18p can be selected. Preferably, the two combustors are diagonally opposed. Diagonally opposed means that the combustors are substantially directly across from each other such as combustor 18a and combustor 18i as well as combustor 18c and combustor 18k in FIG. 2. To be diagonally disposed, the combustors need not be disposed at substantially 180 degrees with respect to each other. For example, combustor 18d and 18m would be considered diagonally opposed. As described later, aspects of the invention are not limited to diagonally opposed combustors.

For the selected two diagonally opposed combustors, fuel is substantially closed off from the A, B and C stages 22,24,26. Fuel continues to be supplied to the pilot nozzle 20 for these two combustors. Further, while this occurs, fuel to the remaining unselected combustors is set to substantially maintain the base load exit temperature from each of combustors. The turbine exhaust temperature can be held substantially at the exhaust temperature limit by the mixing of the expanded fully and unfired gases exiting the plurality of combustor sets. Thus, the lower temperature of the unfired gases in combination with the higher temperature of the fired gases gives an average exhaust temperature. The desired average temperature is held by a control system (not shown) by reducing fuel input if the average temperature is greater than or less than the desired temperature.

Each of the A, B and C stages 22,24,26 can have a separate fuel supply manifold (not shown). The engine controller (not shown) can modulate control valves (not shown) for each stage 22,24,26 until the specified percentage of total flow (measured by orifices in each line) is achieved. The control valve for each stage can close off completely at the command of the control system so as to substantially restrict flow to the various stages 22,24,26. In one embodiment, there can be a valve added on each of the A, B and C stages 22,24,26 in each combustor 18a–18p so that individual shut off can occur.

The amount of fuel supplied to the remaining unselected combustors can be based on IGV position. Compressor inlet mass flow and IGV position can be correlated. As the IGVs close, fuel to each of these unselected combustors can be adjusted to hold the turbine inlet temperature. Alternatively, holding the average exhaust temperature at the limit can automatically hold the turbine inlet temperature on the remaining unselected combustors.

To achieve further load reduction, a second diagonally opposed pair of combustors can be selected. Fuel would be substantially closed off from the A, B and C nozzles 22,24, 26, while continued to be supplied to the pilot nozzle 20. Fuel is still substantially restricted from the A, B and C nozzles 22,24,26 in the first pair of diagonally opposed combustors.

The process of substantially restricting fuel to selected combustor pairs can continue until load is reduced to substantially zero (i.e., when no load operation is achieved). In other words, the process continues until there is substantially zero net power out of the engine; that is, the power produced by the engine is reduced to a point where there is only enough power to drive the compressor with no power left over to drive the generator. For example, in the case of a system having sixteen combustors, at no load fuel may have to be restricted according to aspects of the invention such that only about six of the sixteen combustors are firing.

As noted earlier, the pair of selected combustors are substantially diagonally opposed. Such a relationship between the combustors is preferable as opposed to, for example, adjacent pairs of combustors, to minimize aerodynamic distortion due to fired and unfired flow impinging upon the rotating turbine blades, and to minimize distortion of the stationary turbine components such as blade rings, and vane segments.

However, aspects of the present invention are not limited to diagonally opposed pairs of combustors. The pair of combustors can have almost any relationship with respect to each other. For example, the combustors can be separated by one combustor, such as combustors 18a and 18c in FIG. 2. Alternatively, one combustor can be at substantially 90 degrees with respect to the other combustor, such as combustor 18a and combustor 18d or 18e in FIG. 2. The combustors may even be adjacent, such as combustor 18a and combustor 18b, so long any aerodynamic distortion is within acceptable limits.

Further, aspects of the present invention are not limited to selecting pairs of combustors. For example, load can be reduced according to the invention by restricting fuel to the A, B and C stages 22,24,26 to one combustor at a time. Subsequent combustors can be shut off according to a pattern, such as a diagonal or circular sequence, or according to no particular pattern. Alternatively, aspects of the invention can include selecting more than two combustors at one time, such as a group of three combustors.

One advantage to leaving the pilot nozzles 20 lit in all combustors 18a–18p is that load can be reapplied to hold fired combustors 18a–18p at their design level, and yet maintain the exhaust temperature at its limit. In such case, the load can be reapplied in the reverse sequence to which the load was reduced. Alternatively, the load can be reapplied in accordance with another sequence or to no particular sequence.

Aspects of the present invention are described in the context of a turbine engine system, but these aspects may be applied to any turbine engine such as any engine having a staged dry low NOx system. It will of course be understood that the invention is not limited to the specific details described herein, which are given by way of example only, and that various modifications and alterations are possible within the scope of the invention as defined in the following claims.

What is claimed is:

1. A method for reducing CO emissions during part load operation of a turbine engine comprising the steps of:
   (a) providing a turbine engine having a compressor section, a combustor section and a turbine section, wherein the combustor section includes a plurality of combustors, each combustor including a pilot nozzle and at least one other nozzle, wherein fuel is supplied to the pilot nozzle and the at least one other nozzle of each of the plurality of combustors;
   (b) selecting a first pair of combustors when the turbine engine operates under part load; and
   (c) substantially restricting the supply of fuel to the at least one other nozzle of each of the first pair of combustors while continuing to supply fuel to the pilot nozzle of each of the first pair of combustors, and while continuing to supply fuel to the pilot nozzle and the at least one other nozzle of each of the non-selected combustors.

2. The method of claim 1 wherein the combustor section includes sixteen combustors.

3. The method of claim 1 wherein the at least one other nozzle includes a fuel ring and a plurality of nozzle assemblies disposed about the periphery of the pilot nozzle.

4. The method of claim 1 wherein the engine has an exhaust temperature limit.

5. The method of claim 4 further including the step of:
   (d) maintaining the temperature of the turbine exhaust substantially at the exhaust temperature limit.

6. The method of claim 1 wherein the first pair of combustors are diagonally opposed.

7. The method of claim 1 wherein the pair of combustors are adjacent.

8. The method of claim 1 wherein the pair of combustors are disposed at substantially 90 degrees with respect to each other.

9. The method of claim 1 wherein the compressor section of the engine includes movable inlet guide vanes.

10. The method of claim 9 further comprising the step of:
    (e) moving the inlet guide vanes of the compressor to a closed position.

11. The method of claim 1 further comprising the steps of:
    (f) selecting an additional pair of combustors;
    (g) substantially restricting the supply of fuel to the at least one other nozzle of each of the additional pair of combustors while continuing to supply fuel to each of the pilot nozzles of the additional pair of combustors, and while continuing to supply fuel to the pilot nozzle and the at least one other nozzle of each of the non-selected combustors; and
    (h) repeating steps (f)–(g) until there is substantially zero net power out of the engine.

12. The method of claim 11 further comprising the step of:
    (i) resupplying fuel to at least one of the combustors pairs.

13. The method of claim 12 wherein the fuel is resupplied to at least one of the combustor pairs in a reverse sequence.

14. A method for reducing CO emissions during part load operation of a turbine engine comprising the steps of:
    (a) providing a turbine engine having a compressor section, a combustor section and a turbine section, wherein the combustor section includes a plurality of combustors, each combustor including a pilot nozzle and at least one other nozzle, wherein fuel is supplied to the pilot nozzle and the at least one other nozzle of each of the plurality of combustors;
    (b) selecting a first combustor from the plurality of combustors when the turbine engine operates under part load; and
    (C) substantially restricting the supply of fuel to the at least one other nozzle of the first combustor while continuing to supply fuel to the pilot nozzle of the first combustor, and while continuing to supply fuel to the pilot nozzle and the at least one other nozzle of each of the non-selected combustors.

15. The method of claim 14 further comprising the steps of:
    (d) selecting another combustor,
    (e) substantially restricting the supply of fuel to the at least one other nozzle of the another combustor while continuing to supply fuel to the pilot nozzle of the another combustor, and while continuing to supply fuel to the pilot nozzle and the at least one other nozzle of each of the non-selected combustors, and
    repeating steps (d)–(e) until there is substantially zero net power out of the engine.

16. The method of claim 15 wherein the first combustor and the another combustor are substantially diagonally opposed.

17. The method of claim 14 wherein the at least one other nozzle includes a fuel ring and a plurality of nozzle assemblies disposed about the periphery of the pilot nozzle.

18. The method of claim 14 wherein each of the combustors has an associated base load exit temperature, wherein the supply of fuel is continued to the pilot nozzle and the at least one other nozzle of each of the non-selected combustors so as to substantially maintain the base load exit temperature of each of non-selected combustor.

19. The method of claim 1 wherein each of the combustors has an associated base load exit temperature, wherein the supply of fuel is continued to the pilot nozzle and the at least one other nozzle of each of the non-selected combustors so as to substantially maintain the base load exit temperature of each of non-selected combustor.

20. A method for reducing CO emissions during part load operation of a turbine engine comprising the steps of:
    operating a turbine engine at base load, the turbine engine having a compressor section, a combustor section and a turbine section, wherein the combustor section includes a plurality of combustors, each combustor including a pilot nozzle and at least one other nozzle, wherein fuel is supplied to the pilot nozzle and the at least one other nozzle of each of the plurality of combustors, wherein each of the combustors has an associated base load exit temperature;

when the turbine engine subsequently operates under part load, selecting a first pair of combustors; and substantially restricting the supply of fuel to the at least one other nozzle of each of the first pair of combustors while continuing to supply fuel to the pilot nozzle of each of the first pair of combustors, and while continuing to supply fuel to the pilot nozzle and the at least one other nozzle of each of the non-selected combustors so as to substantially maintain the base load exit temperature of each non-selected combustor.

* * * * *